United States Patent [19]

Ferrier et al.

[11] Patent Number: 5,178,922
[45] Date of Patent: Jan. 12, 1993

[54] FRINGED THERMAL PROTECTION DEVICE

[75] Inventors: Christiane Ferrier, Igny; Jean Claudel, Villejuif, both of France

[73] Assignee: Societe Nationale Industrielle et Aerospatiale, Paris, France

[21] Appl. No.: 523,674

[22] Filed: May 15, 1990

[30] Foreign Application Priority Data

May 16, 1989 [FR] France ................ 89 06379

[51] Int. Cl.⁵ .................. B64C 1/00; B64G 1/00; B32B 3/02; B29D 22/00
[52] U.S. Cl. ................ 428/36.1; 244/117 A; 244/158 A; 428/35.7; 428/36.9; 428/85; 428/86; 428/87; 428/92; 428/95; 428/96; 428/115; 428/119; 428/120; 428/245; 428/255; 428/256; 428/408; 428/902
[58] Field of Search ............ 428/85, 86, 88, 95, 428/96, 408, 902, 36.1, 35.7, 36.9, 87, 92, 115, 119, 120, 245, 255, 256; 244/158 A, 117 A

[56] References Cited

U.S. PATENT DOCUMENTS

| | | | |
|---|---|---|---|
| 3,257,803 | 6/1966 | Reid | 60/356 |
| 3,284,893 | 11/1966 | Reid et al. | 29/527.1 |
| 3,285,518 | 11/1966 | Reid et al. | 239/265.15 |
| 3,603,260 | 9/1971 | Johnson | 428/96 |
| 3,951,718 | 4/1976 | Gonzalez | 428/86 |
| 4,655,866 | 4/1987 | Ferrier | 156/192 |
| 4,729,512 | 3/1988 | Laing | 428/408 |

FOREIGN PATENT DOCUMENTS 0174886 3/1986 European Pat. Off.
2191115 12/1987 United Kingdom.

Primary Examiner—George F. Lesmes
Assistant Examiner—James D. Withers
Attorney, Agent, or Firm—Browdy and Neimark

[57] ABSTRACT

A thermal protection device for protecting walls of structures exposed to ablative flow at high temperatures in the presence of vibrations comprises, embedded in a thermally insulative matrix, a refractory armature formed by a fringed mat comprising a meshed part exposed to the ablative flow and fringes intended to be directed towards the wall of the structure to be protected. The device further comprises an open-weave refractory woven material parallel to the meshed part of the armature and through which the fringes pass.

16 Claims, 2 Drawing Sheets

FRINGED THERMAL PROTECTION DEVICE

BACKGROUND OF THE INVENTION

1. Field of the invention

The present invention concerns a thermal protection device designed to protect the cylindrical casing of a ramjet engine combustion chamber.

The invention is more particularly concerned with an internal thermal protection device for hollow structures subjected to the ablative flow of corrosive gases at high speeds and high temperatures and to high-level vibrations, in particular where such phenomena are inherent to their operation, and with a method of manufacturing this device.

2. Description of the Prior art

In the current state of the art the thermal protection layers of such structures are made from composite materials using organic, organo-metallic or mineral binders possibly including powder, fiber, mineral or organic woven reinforcement. When exposed to hot gases the ablatable material is pyrolyzed. This pyrolysis is accompanied by deterioration of the carbon-based or organo-silicic chain of the binder which renders the scoria fragile and breakable within the mass of material. To alleviate this the thermal protection layer is usually reinforced, by various techniques.

It is known that the ablation of a material of this kind subjected to erosion by hot gases and to vibration is reduced when the material is reinforced. The reinforcing armature embedded in the insulating material may be metallic or non-metallic, woven or fibrous.

The patent U.S. Pat. No. 4,655,866 describes a reinforced thermal protection device of this kind and the method of manufacturing it. The device is for thermally protecting walls along which gas flows, such as ramjet engine combustion chambers.

This prior art patent is of interest because it enabled the development of a flexible, for example silicone protection, reinforced in particular by an armature oriented relative to the gas flow, which confers good resistance to ablation and to loss of material due to vibration inherent to operation of the engine.

An object of the invention is to improve the performance of a device as disclosed in the aforementioned patent, in particular with regard to its mechanical strength following pyrolysis of the binder.

SUMMARY OF THE INVENTION

In one aspect, the invention consists of a thermal protection device for protecting walls of structures exposed to ablative flow at high temperatures in the presence of vibrations, the device comprising, embedded in a thermally insulative matrix, (1) a refractory armature formed by a fringed mat comprising (i) a meshed part exposed to the ablative flow and (ii) fringes intended to be directed towards the wall of the structure to be protected, the device further comprising (2) an open-weave refractory woven material parallel to the meshed part of the armature and through which said fringes pass.

The effect of implanting in a fringed mat a woven material in which the threads are advantageously twisted or spiralform (in the form of helical coils) is to maintain the integrity of the scoria after deep pyrolysis of the thermal protection and even after deterioration of its adhesive bonding to the wall to be protected. The effect of the spiralform woven material is to bind the layers of fringes together and to solidify the structure.

Advantageously, the refractory woven material is in the form of interpenetrating parallel spiralform filaments, which makes the woven material very flexible in a direction parallel to the filaments.

The refractory woven material may be chosen from the following materials: steel, carbon impregnated with a resin which stiffens or rigidifies the woven material, hereinafter termed a stiffener resin, silica impregnated with a stiffener resin or some other organic or non-organic resin.

In accordance with non-limiting preferred features of the invention:

the thermally insulative matrix in which the refractory armature is embedded is silicone-based, i.e. a silicone resin forms a substantial part of the matrix, the matrix is charged with silicon carbide fibers and powder or any other refractory (powder) material, the fringed mat is made from silicon carbide or any other refractory (fiber) material, the device is cylindrical and the armature is formed by a fringed tape wound on in a spiral.

In another aspect the invention consists of a method of manufacturing a thermal protection device to protect the inside of a cylindrical wall exposed to ablative flow at high temperatures and in the presence of vibration, in which method:

a fringed refractory tape is wound onto a mandrel so that the fringes are oriented so as to project radially outwardly relative to the mandrel so as to form a fringed mat, the fringed mat is impregnated with a thermally insulative substance that can be polymerized, an open-weave refractory woven material is disposed around the impregnated fringed mat, the filaments of the woven material are caused to penetrate between the fringes of the fringed mat, and the resulting assembly is cured.

According to non-limiting preferred features of the invention:

the filaments of the woven material are caused to penetrate between the fringes of the fringed mat by winding a filament or tape around the woven material, the filament or tape is made from a refractory material, the filament or tape is made from steel, the filament or tape is made from silicon carbide, the filament or tape is made from carbon fibers, the filament or tape is made from silica fibers, the cured assembly is machined to match the inside diameter of the cylindrical wall to be protected, it is principally the base of the fringes that are impregnated in order to facilitate penetration of the free ends of the fringes into the woven material, the curing is carried out under pressure, the thermally insulative matrix is silicone-based and the curing is carried out at 100° C. at a pressure of 10 bars for one hour 30 minutes, the fringed tape is silicon carbide based, the woven material is in the form of interpenetrating parallel spiralform filaments, the woven material is made from steel.

The performance of a protective material in accordance with the invention depends on the following parameters:

the nature of the fringes (nature and size of the fibers): this is chosen according to the required thickness of the thermal protection, the previously chosen type of structure (woven material) and the depth to which it is applied; the fringes, once wound, must be in a plane as close as possible to the radial plane and the ends of the fringes must not be impregnated (or must be impregnated to only a limited degree) so that said fringes can easily be inserted into the spiralform woven material;

the tension with which the fiber or tape is bound: this tension directly influences the inclination of the fringes and their ability to remain in a radial plane of the mandrel;

the nature and therefore the viscosity of the impregnating substance: a substance with too low a viscosity is not suitable as it may run; the substance must have a consistency such that it wets the fringes perfectly while itself remaining sufficiently thixotropic for the tape to retain its original shape and not to run;

the machine parameters (feed pressure, size and position of the fringes): these are all factors conditioning the obtaining of a correct base for the implantation of the mesh.

Objects, characteristics and advantages of the invention will emerge from the following description given by way of non-limiting example with reference to the appended drawings.

DETAILED DESCRIPTION OF THE INVENTION

Figure 1:
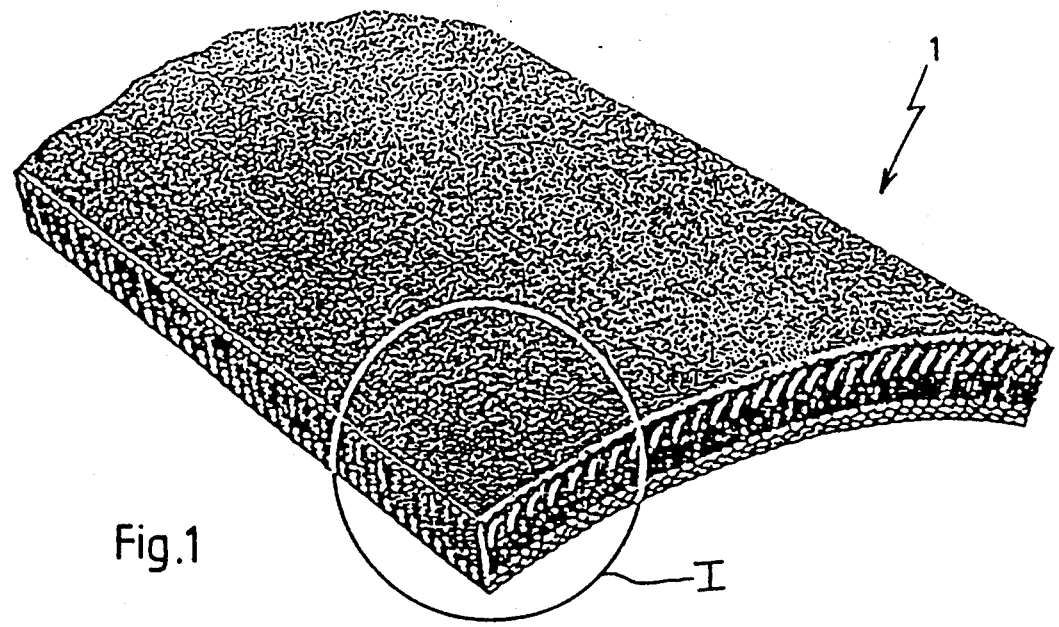
FIG. 1 is a partial perspective view of a thermal protection device in accordance with the invention.
Figure 2:
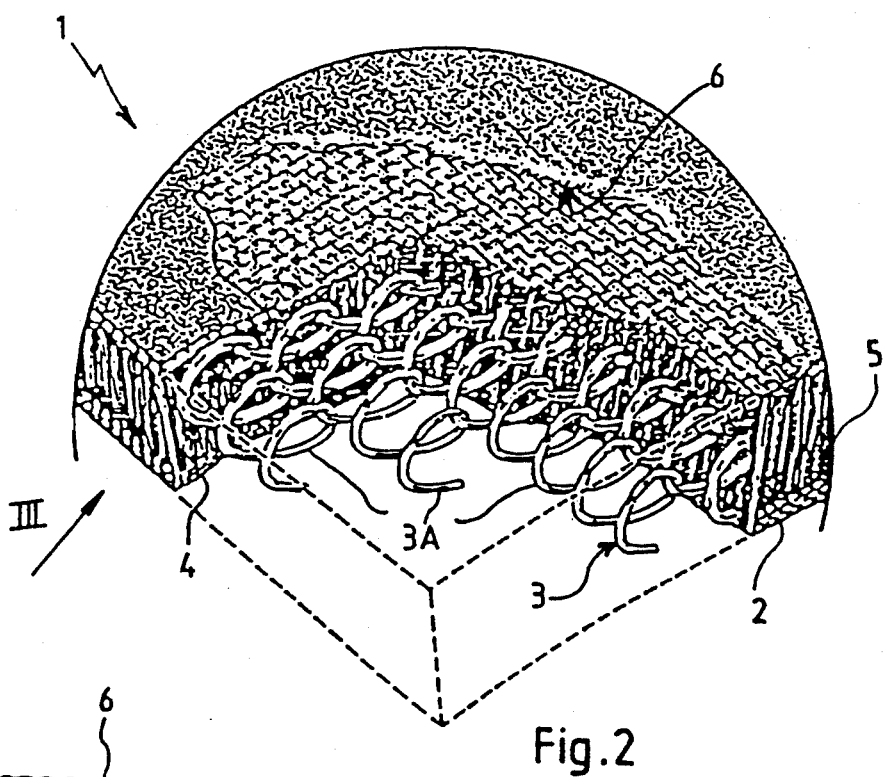
FIG. 2 is a partially cut away enlarged view of the detail I from FIG. 1.
Figure 3:
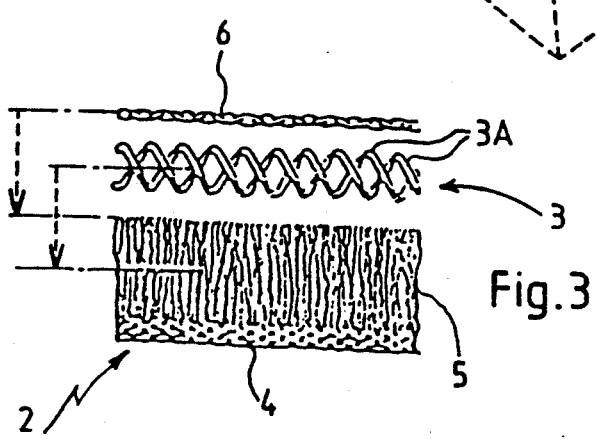
FIG. 3 is a side view of the device from FIG. 2, as seen in the direction of the arrow III in FIG. 2, in an exploded form showing the main stages in the manufacture of the device.

As is seen from FIGS. 1 through 3 a thermal protection device 1 in accordance with the invention comprises, embedded in a thermally insulative matrix which impregnates it, a refractory armature 2 and an open-weave material 3.

The refractory armature 2 is formed by a fringed mat including a meshed part 4 designed to be exposed to the ablative flow and fringes 5 designed to face towards the wall of the structure to be protected.

The open-weave material 3 comprises interpenetrating parallel spiral filaments 3A.

The spiral filaments 3A are entirely enclosed between the fringes 5 of the armature 2, which therefore pass completely through the open weave of the woven material 3.

The meshed part is advantageously meshed also in the direction of its thickness.

A protection layer 6, advantageously of a refractory nature, is disposed at the ends of the fringes and fixed to them, for example by way of the adhesive nature of the insulative matrix.

This insulative matrix material is advantageously polymerizable.

When, as in the case in FIGS. 1 through 3, the device 1 is part-cylindrical, the spiralform filaments 3A are oriented parallel to the generatrices of the cylinder so that the curvature of the device does not lead to any significant deformation of the spiralform filaments themselves.

Figure 4:
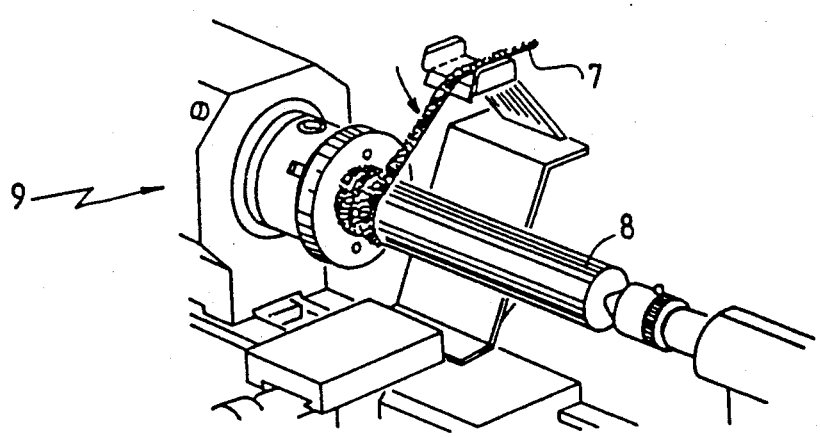
FIG. 4 is a perspective view of a mandrel around which a fringed tape is wound in a first stage of the method of manufacturing the device from FIGS. 1 through 3.
Figure 5:
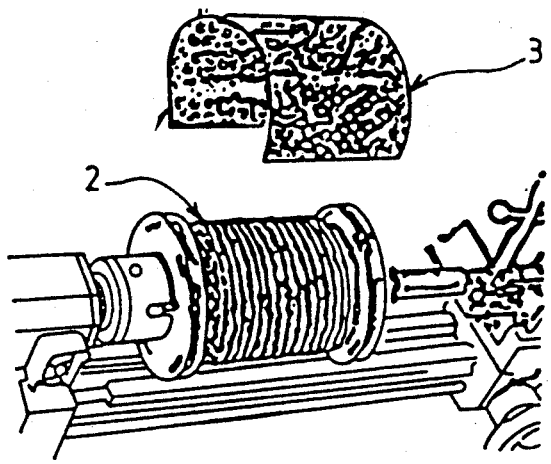
FIG. 5 is a perspective view showing the tape wound in a previous stage and a piece of woven material on the point of being wound around the mandrel.
Figure 6:
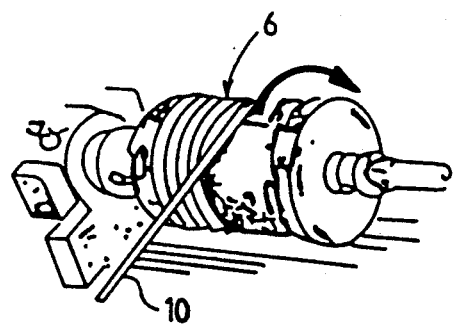
FIG. 6 is a perspective view of a refractory tape being wound around the mandrel, the fringed tape and the woven material during another stage in the manufacturing process, in which the fringes on the tape are caused to interpenetrate with the woven material.

FIGS. 4 through 6 show the principal stages in manufacturing this device:

in FIG. 4 a non-impregnated fringed tape 7 is being wound onto a mandrel 8 with a diameter at least equal to the usable inside diameter of the combustion chamber, the mandrel 8 being mounted on a machine 9, the resulting fringed mat 2 is impregnated by means of a transfer device that is not shown (transfer press and pot or transfer gun, for example) which applies between rows of fringes a filled silicone substance which impregnates the refractory matrix of the protection device (which constitutes the aforementioned insulative matrix), in FIG. 5 the metal spiralform woven material 3 is being readed for placement over and implantation into the wound and impregnated mat 2;

in FIG. 6 the resulting structure is being bound by winding on a refractory filament or tape 10 constituting the aforementioned layer 6, the mandrel and the structure wound onto it are put into an autoclave (not shown) and cured at a temperature of 100° C. and a pressure of 10 bars for one hour 30 minutes, the resultant thermal protection body 1 is machined to thickness, preferably by machining it down to the level of the metal woven material.

The spiralform filaments of the woven material 3 are parallel to the axis of the mandrel.

For this operation to be carried out under optimum conditions:

the ends of the fringes must not be impregnated, or must be impregnated to only a limited degree, so that the fringes can readily penetrate the woven material, the fringes must be in a plane as close as possible to the radial direction of the mandrel, the silicone matrix must have a consistency such that the fringes are totally wetted, but it must also be sufficiently thixotropic for the tape to retain its original form and not run.

In one specific embodiment of this thermal protection the materials used are as follows:

silicon carbide fringes
thread count: 1 000 threads/tuft
length: 12 mm
base height: 3.5 mm
beat-up: 3/cm
weight/m: 3.8 g
mixture composition (prepared by any suitable known method):
RTV 630 A (100 parts)
RTV 630 B (10 parts) Supplier: G.E.
SiC powder (25 parts)
SiC fibers (6 parts)
PR 67 retardant (2 parts)
stainless steel spiralform woven material:
void (separation of filaments): 3 mm filament diameter: 0.6 mm
pitch of spirals: 5 mm These materials yield a product with the following mean characteristics:

$e_m \simeq 8.5-9$ mm
$d_m \simeq 1.8$ g/cm$^3$
$\lambda_m \simeq 0.53$ W/m/°C.
$C_m \simeq 1.15/g/°$ where:
$e_m$ = mean thickness
$d_m$ = mean density
$\lambda_m$ = mean thermal conductivity
$C_m$ = mean specific heat It goes without saying that the foregoing description has been given by way of non-limiting example only and that numerous variant embodiments may be proposed by those skilled in the art without departing from the scope of the invention.

There is claimed:

1. Thermal protection device for protecting a structure wall to be submitted to an ablative flow at high temperatures, said device comprising:
   a thermally insulative matrix layer for extending parallel to the structure wall;
   an open-weave refractory woven material provided with meshes and embedded in said thermally insulative matrix layer and extending parallel thereto;
   a refractory armature separate from said woven material and embedded in said thermally insulative matrix and comprising ablation means for exposure to the ablative flow, said ablation means comprising a meshed part, and fringes integral with said meshed part and extending through said meshes of said open-weave refractory woven material.

2. Device according to claim 1 wherein said refractory woven material is in the form of interpenetrating parallel spiral form filaments extending substantially parallel to said meshed part.

3. Device according to claim 1 wherein said woven material is made from steel filaments.

4. Device according to claim 1 wherein said woven material is made from carbon impregnated with a stiffener resin.

5. Device according to claim 1 wherein said woven material is made from silica fibers impregnated with a resin.

6. Device according to claim 1 wherein said thermally insulative matrix comprises silicon resin.

7. Device according to claim 6 wherein said matrix is charged with silicon carbide fibers and powder.

8. Device according to claim 7 wherein said refractory armature is made from silicon carbide fibers.

9. Device according to claim 1 which is cylindrical and in which said armature is formed by a fringed tape wound in a spiral having an axis, and said refractory woven material comprises interpenetrating parallel spiral form filaments extending substantially parallel to said axis.

10. A device according to claim 1, wherein said thermally insulative matrix comprises a polymerized resin.

11. A thermal layer for protecting a structural wall therebeneath against ablative flow at high temperatures, comprising:
    a refractory armature in the form of a fringed mat formed of refractory fibers and including (i) ablation means for contact with hot gases and comprising a meshed part forming a surface layer for exposure to the ablative flow, and (ii) fringes integral with and extending from said meshed part in a direction substantially perpendicular therefrom;
    an open-weave refractory woven material formed of stiff fibers and provided with meshes, said meshes comprising interlocking adjacent coils extending generally parallel to one another, and said coils and said fringes of said armature being interpenetrating with one another whereby said fringes extend through said coils; and
    a thermally insulative matrix embedding said refractory armature and said open-weave refractory woven material.

12. A layer according to claim 11 which at least partly forms a cylinder with an axis, and wherein said coils of said meshes extend parallel to said axis.

13. A layer according to claim 11, wherein said thermally insulative matrix comprises a polymerized resin.

14. A thermal layer according to claim 11, wherein said stiff fibers of said open-weave refractory woven material are selected from the group consisting of steel, carbon impregnated with a stiffener resin, silica impregnated with a stiffener resin and silicon carbide fibers; and said refractory fibers forming said refractory armature are selected from the group consisting of steel and silicon carbide fibers.

15. A thermal protection device for protecting walls of structures exposed to ablative flow at high temperatures in the presence of vibrations comprising:
    a refractory armature formed by a fringed mat including ablation means for contact with the ablative flow and fringes substantially perpendicular to said ablation means, said ablation means comprising a mesh structure;
    an open-weave refractory woven material formed of steel fibers and lying adjacent to the mesh structure of the armature and through the meshes of which said fringes pass; and
    a thermally insulative matrix embedding said refractory armature and said open-weave refractory woven material.

16. A device according to claim 15, wherein said thermally insulative matrix comprises a polymerized resin.

* * * * *

UNITED STATES PATENT AND TRADEMARK OFFICE
CERTIFICATE OF CORRECTION

PATENT NO. : 5,178,922
DATED : Jan. 12, 1993
INVENTOR(S) : FERRIER et al.

It is certified that error appears in the above-identified patent and that said Letters Patent is hereby corrected as shown below:

On the title page, Item [73], delete "Societe Nationale Industrielle et Aerospatiale" and insert therefore --AEROSPATIALE SOCIETE NATIONALE INDUSTRIELLE--

Signed and Sealed this

Twenty-third Day of November, 1993

Attest:

BRUCE LEHMAN

*Attesting Officer*   *Commissioner of Patents and Trademarks*